US012304686B2

(12) United States Patent
Bardini

(10) Patent No.: US 12,304,686 B2
(45) Date of Patent: May 20, 2025

(54) LABELING MACHINE

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 80 days.

(21) Appl. No.: 18/278,233

(22) PCT Filed: Sep. 16, 2021

(86) PCT No.: PCT/EP2021/075455
§ 371 (c)(1),
(2) Date: Aug. 22, 2023

(87) PCT Pub. No.: WO2022/184289
PCT Pub. Date: Sep. 9, 2022

(65) Prior Publication Data

US 2024/0124185 A1 Apr. 18, 2024

(30) Foreign Application Priority Data

Mar. 2, 2021 (IT) ........................ 102021000004805

(51) Int. Cl.
*B65C 9/18* (2006.01)
*B26D 7/01* (2006.01)
*B65C 9/02* (2006.01)

(52) U.S. Cl.
CPC .............. *B65C 9/1819* (2013.01); *B65C 9/02* (2013.01); *B26D 7/018* (2013.01); *B65C 2009/1838* (2013.01); *Y10T 156/1033* (2015.01)

(58) Field of Classification Search
CPC . B65C 9/1819; B65C 2009/1838; B65C 3/06; B65C 3/08; B65C 3/14; B65C 3/16;
(Continued)

(56) References Cited

U.S. PATENT DOCUMENTS 3,963,557 A 6/1976 Patterson
2012/0175039 A1 7/2012 Scapinelli
2017/0081070 A1* 3/2017 Bardini ..................... B65C 9/32

FOREIGN PATENT DOCUMENTS

CN 211993242 A 11/2020
DE 102014223594 A1 5/2016
(Continued)

OTHER PUBLICATIONS

International Search Report and Written Opinion issued Dec. 17, 2021 which pertains to PCT Patent Application No. PCT/EP2021/075455, filed Sep. 16, 2021. 8 pages.
(Continued)

*Primary Examiner* — Carson Gross
(74) *Attorney, Agent, or Firm* — THOMPSON HINE LLP

(57) ABSTRACT

A labeling machine includes a conveyor of containers to be labeled along an advancement path and at least one labeling station which is arranged along the advancement path of the containers. The labeling station supports at least one cutting device for the label ribbon. The cutting device includes a respective suction chamber which accommodates internally at least one blade. The suction chamber is connectable with an air suction device, in order to attract the label ribbon toward the inside of the suction chamber and against the blade and in so doing cutting the label ribbon. The cutting device includes at least one respective blade supporting block which is supported by the cutting drum and supports the blade. At least one portion of the blade supporting block
(Continued)

is provided internally with at least one cavity for attenuating noise generated by cutting the label ribbon.

7 Claims, 4 Drawing Sheets

(58) Field of Classification Search
CPC ............... B65C 3/163; Y10T 156/1033; B32B 38/0004; B32B 38/1858; B26D 7/018; B26D 1/62; B26F 1/384
USPC .......................................................... 83/177
See application file for complete search history.

(56) References Cited

FOREIGN PATENT DOCUMENTS

| | | | |
|---|---|---|---|
| JP | S 50-062766 | U | 6/1975 |
| JP | S 51-072886 | U | 6/1976 |
| JP | S 57-070813 | U | 4/1982 |
| JP | 2017-520482 | A | 7/2017 |
| WO | 2009/078797 | A1 | 6/2009 |
| WO | 2015/173091 | A1 | 11/2015 |

OTHER PUBLICATIONS

Japanese Patent Office, Notice of Reasons for Refusal issued in corresponding JP Application No. 2023-553414 issued Mar. 10, 2025, 11 pages.

* cited by examiner

LABELING MACHINE

The present invention relates to a labeling machine.

It is known that container labeling machines have, generally, a conveyor for the containers to be labeled, which is typically constituted by a rotating carousel, which has, peripherally, a plurality of rotating supports, each one is designed to receive an individual container and to make it rotate about its own axis.

At least one labeling station is arranged along the perimeter of the carousel and is provided with an unreeling assembly which makes it possible to take a label ribbon, on which multiple labels are printed in succession, from a reel and which feeds a cutting drum which is capable of receiving the label ribbon so that it adheres to the lateral surface thereof and of cutting it, in order to separate the individual labels from it, which are subsequently transferred onto the containers in transit on the carousel.

In some labeling machines, the cutting drum also performs the function of the transfer drum, since it not only cuts the label ribbon but it also transfers the individual labels, separated after cutting, to the corresponding container transported by the carousel. In this case, the cutting drum is more properly called the "cutting and transfer drum".

For example, EP2091822, in the name of this same applicant, discloses a cutting and transfer drum that is provided with a plurality of blades, which are mutually spaced apart along circumferential portions substantially equal in extension to the length of the labels, and which can be actuated to move individually via actuating cylinders, so as to cut the label ribbon in the separation region between the labels.

The principal drawback of cutting and transfer drums of this type lies in their complexity of construction and in the corresponding difficulty of adapting them when changing the format of the labels.

Also known is a labeling machine, disclosed in Italian patent no. 102016000128413, again in the name of this same applicant, in which there is a cutting drum, which is designed to receive on the lateral surface thereof the label ribbon fed by the unreeling assembly, and which is provided, along the lateral surface thereof, with a plurality of cutting devices, angularly mutually spaced apart about the axis of the cutting drum, which make it possible to cut the labels from the label ribbon by way of suction of the label ribbon against a blade.

In particular, each one of these cutting devices is provided with a respective blade, which is integrally fixed to the transfer drum and accommodated in a corresponding suction chamber, which is open at the lateral surface of the cutting drum and which can be placed in communication with air suction means, in such a way as to be able to attract the label ribbon toward the inside of the suction chamber, so as to push it against the blade, obtaining as a consequence the cutting thereof.

The cutting drum just described, although capable of overcoming the drawbacks described above, does however generate a certain amount of noise when cutting the label ribbon.

The aim of the present invention is to provide a labeling machine that is capable of improving the known art in one or more of the above mentioned aspects.

Within this aim, an object of the invention is to provide a labeling machine that makes it possible to reduce the noise emitted during the cutting of the label ribbon.

Another object of the invention is to provide a labeling machine that makes it possible to carry out the change of format of the labels without particular difficulties.

Another object of the present invention is to provide a labeling machine that is capable of offering the widest guarantees of reliability and safety in its operation.

A further object of the present invention is to overcome the drawbacks of the background art in a manner that is alternative to any existing solutions.

Another object of the invention is to provide a labeling machine that is relatively easy to provide and which can be produced at low cost, so as to be competitive also from a purely economic viewpoint.

This aim and these and other objects which will become better apparent hereinafter are achieved by a labeling machine according to claim 1, optionally provided with one or more of the characteristics of the dependent claims.

Further characteristics and advantages of the invention will become better apparent from the description of preferred, but not exclusive, embodiments of the labeling machine according to the invention, which are illustrated for the purposes of non-limiting example in the accompanying drawings wherein.

Figure 1:
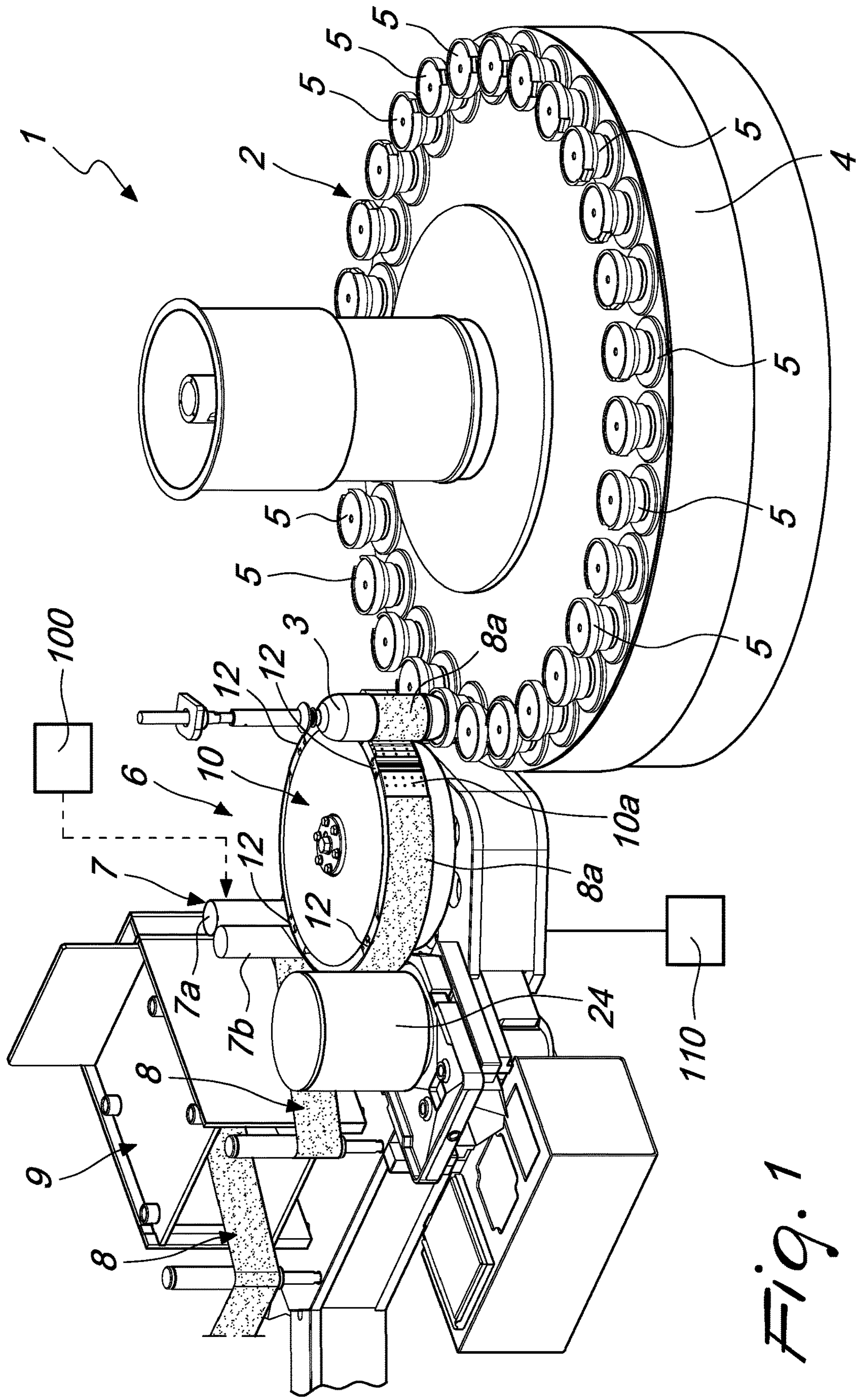
FIG. 1 is a perspective view of a labeling machine according to the invention.
Figure 2:
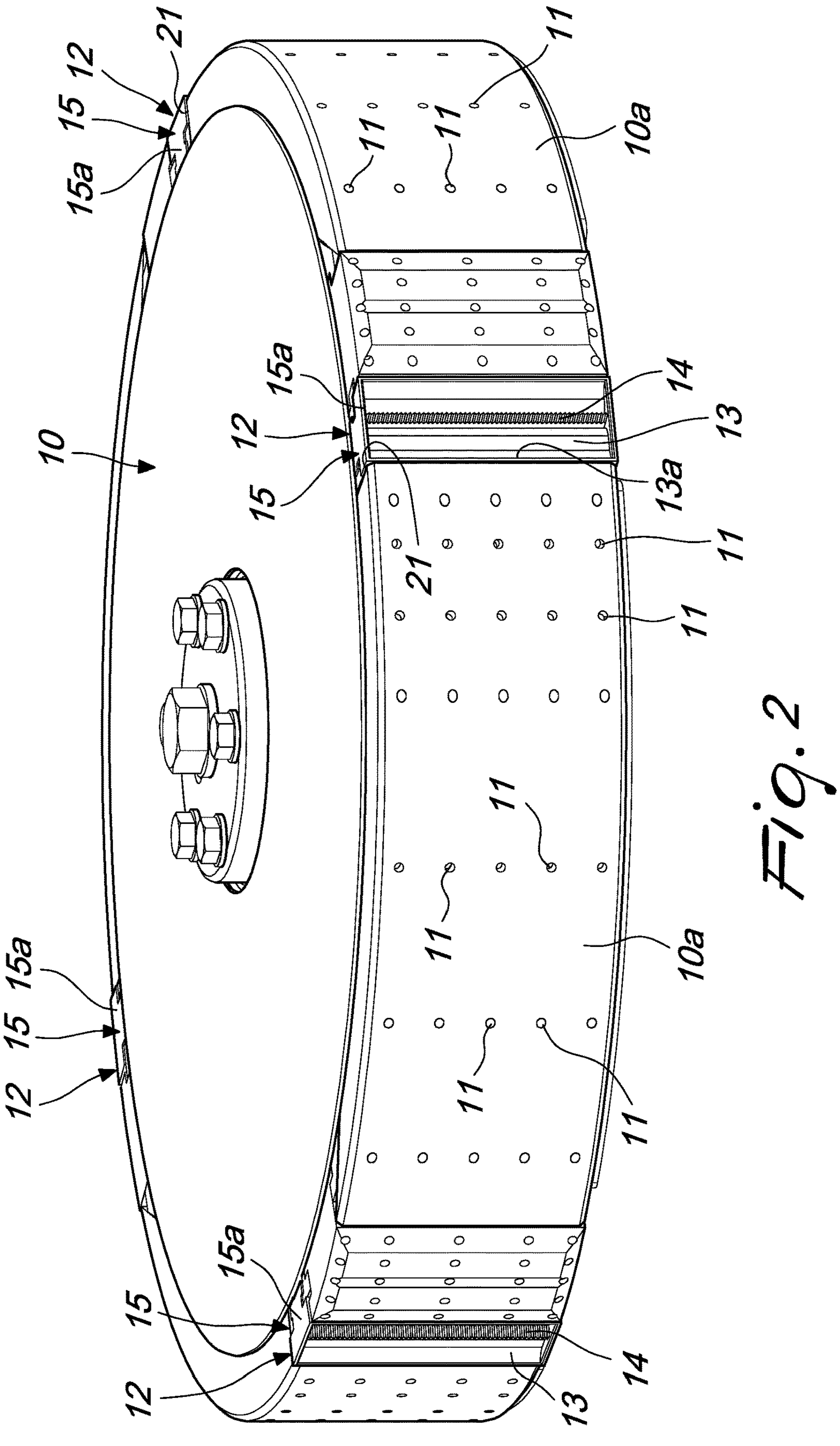
FIG. 2 is a perspective view of a cutting drum of the machine according to the invention.

With reference to the figures, the container labeling machine according to the invention, generally designated by the reference numeral 1, comprises a conveyor 2 of containers 3 to be labeled along an advancement path, which is constituted, for example, by a carousel 4, which is actuated in rotation about its own axis and which is peripherally provided with rotating supports 5, each one is designed to support an individual container 3, so as to make it rotate around its axis.

Along the advancement path of the containers 3 defined by the conveyor 2, there is at least one labeling station 6 which is designed to apply a respective label 8*a* on the containers 3 in transit on the conveyor 2, which is obtained by cutting a continuous label ribbon 8, on which a plurality of labels 8*a* are printed in succession.

In particular, the labeling station 6 comprises an unreeling assembly 7, which is constituted, for example, by a pair of mutually opposite entraining rollers 7*a*, 7*b*, which makes it possible to take the label ribbon 8 from a reel, not shown, making it pass, conveniently, through a tension adjustment device 9.

At the outlet of the unreeling assembly 7, the label ribbon 8 is transferred to a cutting drum 10, which can move in rotation about its own axis and is designed to receive, so that it adheres to its own lateral surface 10*a*, the label ribbon 8 fed by the unreeling assembly 7, by virtue of suction ports 11 defined on the lateral surface of the cutting drum 10 and connected to air suction means, which are constituted, for example, by a vacuum pump 110.

The cutting drum 10 supports, in particular, along its peripheral region, at least one cutting device 12 which can be activated, on command, using actuation means, to carry out the cutting of the label ribbon 8, so as to obtain the labels 8*a* to be transferred to the containers 3 that transit on the conveyor 2.

It should be noted that on the cutting drum 10 there can be, optionally, more than one cutting devices 12, arranged circumferentially, about the axis of the cutting drum 10, conveniently at a distance from each other at least equal to the length of the individual labels 8*a*.

More specifically, each cutting device 12 comprises a respective suction chamber 13, which is open at the lateral surface 10*a* of the cutting drum 10 and inside which at least one blade 14 is accommodated, which substantially lies on a radial plane with respect to the axis of the cutting drum 10 so as to be able to carry out the cutting of the label ribbon 8 along a direction that is substantially transverse with respect to the longitudinal extension of the label ribbon.

Figure 4:
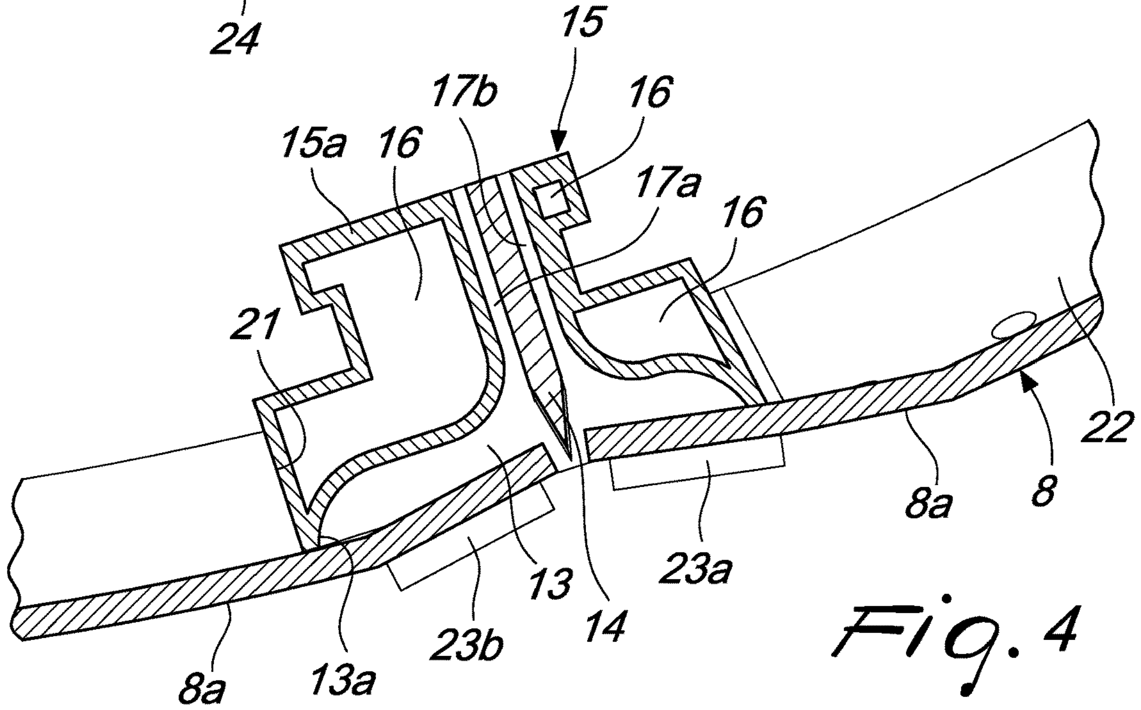
FIG. 4 is an enlarged-scale cross-sectional view of a detail of the cutting drum of the machine according to the invention.
Figure 6:
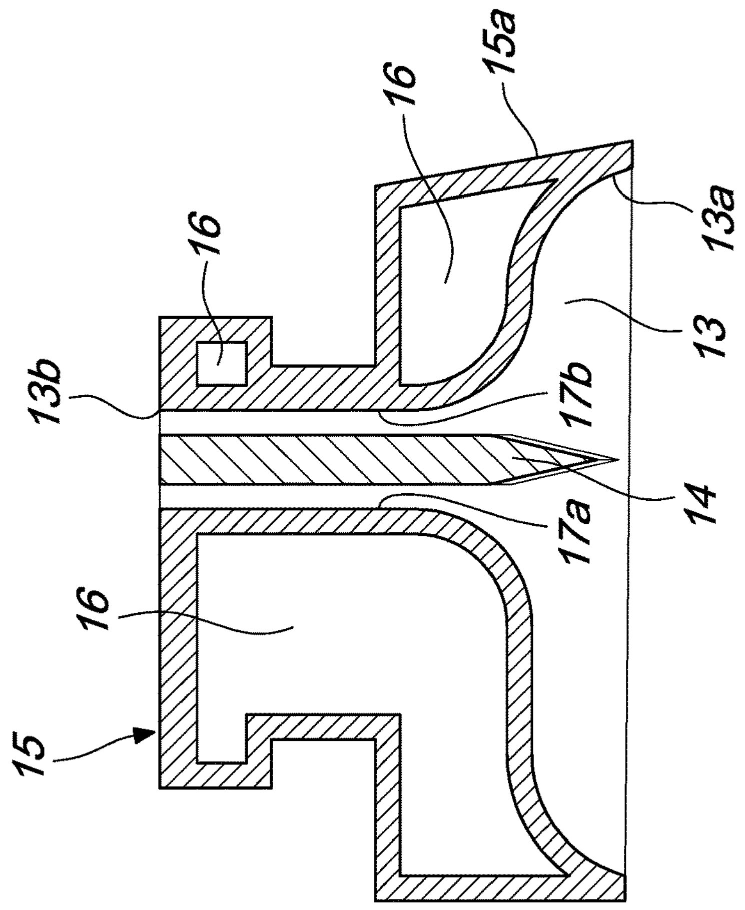
FIG. 6 is a cross-sectional view taken along the line VI-VI of FIG. 5.
Figure 5:
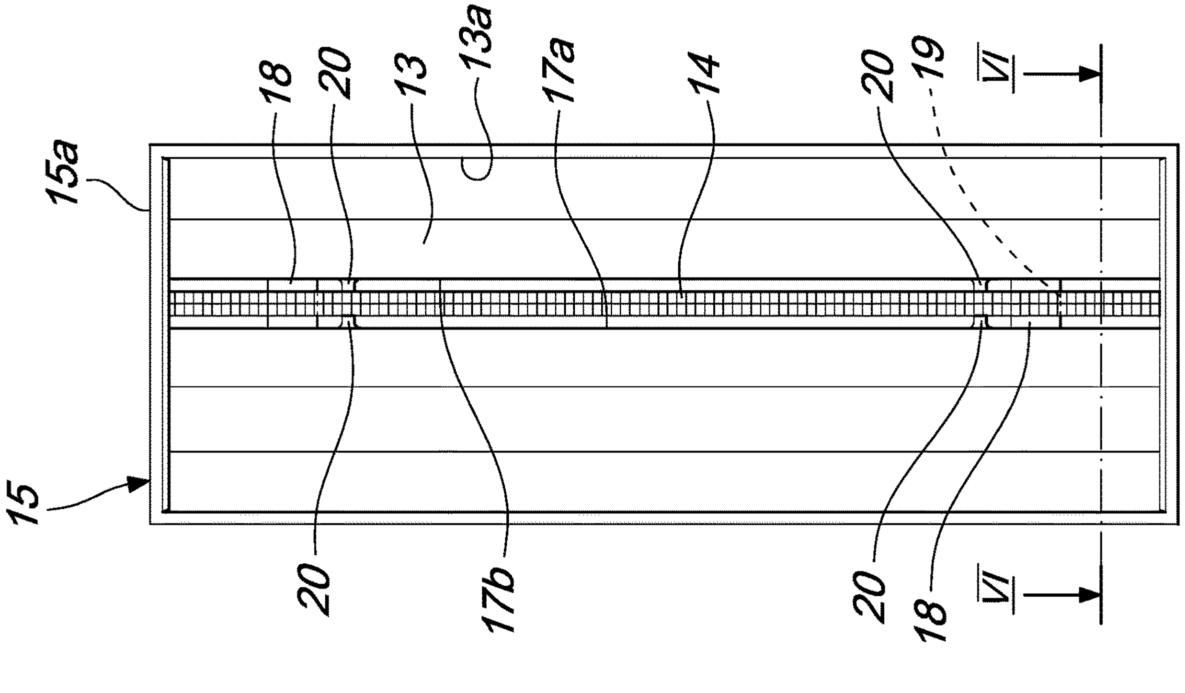
FIG. 5 is a front elevation view of a blade supporting block of the machine according to the invention.

The suction chamber 13 of each cutting device 12 can be connected with air suction means, which are constituted, conveniently, by the vacuum pump 110, so as to exert on the label ribbon 8 an action of attraction toward the inside of the suction chamber 13, so as to bring the label ribbon 8 against the blade 14, which consequently cuts it, as shown in FIG. 4.

According to the invention, the (or each) cutting device 12 comprises a respective blade supporting block 15 which is supported by the cutting drum 10 and which, in turn, supports the blade 14.

Conveniently, this blade supporting block 15 delimits at least one portion of the suction chamber 13.

Also according to the invention, at least one portion of the blade supporting block 15 is provided internally with at least one cavity 16 for attenuating the noise generated by the cutting of the label ribbon 8 by the corresponding blade 14.

Conveniently, this cavity 16 can be, at least partially, filled with a material that is different from the material with which the blade supporting block 15 is made. For example, the cavity 16 can be filled with gas or a mixture of gases, like air, or with a material that has noise-reduction characteristics, such as a noise-reducing polyurethane foam or the like.

Alternatively, there can be a vacuum in the cavity 16.

In more detail, the blade supporting block 15 is constituted by a box-like body 15*a* inside which the suction chamber 13 is defined.

Conveniently, the box-like body 15*a* has a side directed toward the outside of the cutting drum 10, in which a suction opening 13*a* is defined that communicates with the suction chamber 13 and is arranged substantially at the lateral surface 10*a* of the cutting drum 10, in order to allow the label ribbon 8 to access the inside of the suction chamber 13, and an opposite side, directed toward the inside of the cutting drum 10, in which a connection opening 13*b* is defined that also communicates with the suction chamber 13, which enables the connection of the suction chamber 13 with the air suction means.

In this case, the cavity 16 is defined in at least one wall of the box-like body 15*a*.

More specifically, the box-like body 15*a* is provided, internally, with at least two walls 17*a*, 17*b* delimiting the suction chamber 13, which are mutually opposite and mutually facing and between which the blade 14 is interposed.

In at least one and, more preferably, in both of the two above mentioned walls 17*a*, 17*b* there is at least one cavity 16.

Advantageously, the box-like body 15*a* supports, inside the suction chamber 13, locking pins 18 which pass through respective retention openings 19, defined in the blade 14, in order to enable the coupling of the blade 14 to the box-like body 15*a*.

In particular, these locking pins 18 are, advantageously, supported by at least one of the delimiting walls 17*a*, 17*b*.

It should be noted that on the walls 17*a*, 17*b* there are, furthermore, spacing projections 20 which are adapted to abut against the blade 14 in order to center it with respect to the walls 17*a*, 17*b*.

Conveniently, the blade supporting block 15 and, more specifically, the box-like body 15*a* of each cutting device 12 can be uncoupled from the cutting drum 10 in order to allow it to be cleaned and the corresponding blade 14 to be replaced, in the event of wear.

To this end, in the body of the cutting drum 10 accommodation seats 21 are peripherally defined, in which the box-like bodies 15*a* of the cutting devices 12 can be removably seated via a sliding movement along a direction that is substantially parallel to the axis of the cutting drum 10.

In order to optimally guide the movement to insert and extract the box-like bodies 15*a* into and out of the accommodation seats 21, each one of the box-like bodies 15*a* has, at its end that is designed to be directed toward the inside of the cutting drum 10, a substantially dovetail-shaped portion which engages a correspondingly-shaped portion of the corresponding accommodation seat 21.

It must be noted that, as in the embodiment shown, each cutting device 12 of the cutting drum 10 can be associated with a respective skid 22, which is integral with the cutting drum 10 and is mounted protruding from the remaining part of the lateral surface 10*a* of the cutting drum 10, in order to allow the application of two strips of glue 23*a* and 23*b*, respectively at the trailing edge and at the leading edge of two consecutive labels 8*a* on the label ribbon 8, by a glue applicator roller 24, which is arranged adjacent to the cutting drum 10, before the label ribbon 8 is cut by the corresponding cutting device 12.

More specifically, the skid 22 of each cutting device 12 is positioned in front of the corresponding cutting device 12, along the direction of rotation of the cutting drum 10, and there are, in this case, means of controlling the machine, which are constituted by an electronic controller 100 and are adapted to drive the unreeling assembly 7 in order to command, after the application by the applicator roller 24 of the two strips of glue 23*a*, 23*b* on two consecutive labels 8*a* resting on one of the skids 22, a slowing of the feeding speed of the label ribbon 8 with respect to the peripheral speed of the cutting drum 10, in order to bring the cutting device 12 situated behind the skid 22, on which the two consecutive labels 8*a* were placed, to the portion of the label ribbon 8 interposed between the two strips of glue 23*a* and 23*b* on which the cut is to be made; after which the feeding speed of the label ribbon 8 is returned to its previous value.

Again with reference to the embodiment shown in the figures, after the label ribbon 8 has been cut by the cutting device 12 that has been positioned between the two strips of glue 23*a*, 23*b*, the label 8*a* that was separated from the label ribbon 8 following the cut is brought, by the cutting drum 10, to adhere to a respective container 3 arriving on the conveyor 2.

Alternatively, the cutting drum 10 can also transfer the labels 8*a* obtained after cutting to a transfer drum, which is conveniently subdivided, at its peripheral region, into sectors that have a circumferential extension of substantially equal length to the length of the labels 8*a* and which are adapted, in each instance, to each receive a respective label

8*a* from the cutting drum 10 and to bring it into contact with the corresponding container 3 transiting on the conveyor 2.

In this case, the cutting drum 10 can be without skids 22, which can instead be provided at the edges of each sector of the transfer drum, laterally to which the glue applicator roller 24 will therefore be positioned.

It must also be noted that there is no reason why the machine according to the invention cannot be used with label ribbons 8 of the pre-glued type i.e. be provided on the reel with strips of glue pre-applied to the edges of the labels 8*a*. In this case, the skids 22 and the glue applicator roller 24, not being necessary, can be absent.

The operation of the machine, according to the invention, is the following.

With reference to the embodiment shown, the label ribbon 8 is fed by the unreeling assembly 7 to the cutting drum 10 at a first feeding speed, substantially equal to the peripheral speed of the cutting drum 10, and is kept adhered on the lateral surface 10*a* of the cutting drum 10 with the leading and trailing edges of two consecutive labels 8*a* resting on one of the skids 22, so that, when this skid 22 passes in front of the applicator roller 24, the latter applies the strips of glue 23*a* and 23*b* on the leading and trailing edges of the two labels 8*a*.

Figure 3:
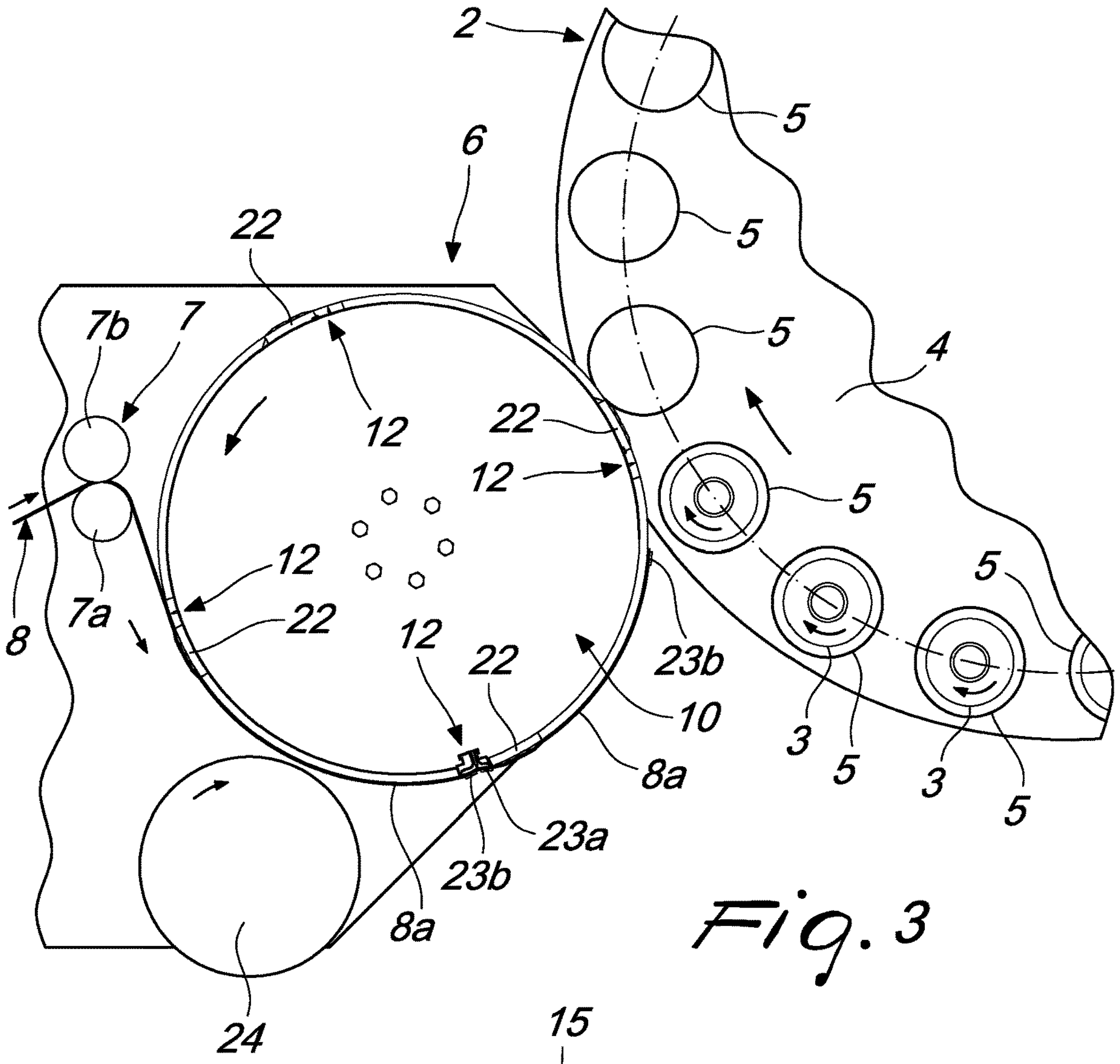
FIG. 3 is a partially cross-sectional plan view from above of the machine according to the invention.

At this point, the control means of the machine command the unreeling assembly 7 to feed the label ribbon 8 to the cutting drum 10 at a second feeding speed, slower than the first feeding speed, so as to position, via the consequent slipping of the cutting drum 10 on the label ribbon 8, the cutting device 12 arranged behind the skid 22 that previously had passed in front of the applicator roller 24 at the portion of the label ribbon 8 that is situated between the two strips of glue 23*a* and 23*b* that were applied by the applicator roller 24, as shown in FIG. 3.

In this situation, the control means of the machine command the unreeling assembly 7 to again feed the label ribbon 8 at the first feeding speed so that the cutting device 12 and the portion of the label ribbon 8 interposed between the strips of glue 23*a* and 23*b* move in synchronization with each other and the cutting device 12 arranged at the portion of the label ribbon 8 is activated by connecting the corresponding suction chamber 13 with the air suction means, so that the label ribbon 8, by being consequently attracted toward the inside of the corresponding suction chamber 13, can be cut by the blade 14 as shown in FIG. 4.

The noise generated by the cutting of the label ribbon 8, thus executed, is optimally deadened by the presence of the cavities 16 in the walls 17*a*, 17*b* of the box-like body 15*a* that supports the blade 14.

After the label ribbon 8 has been cut, the control means of the machine command the unreeling assembly 7 to feed the label ribbon 8 to the cutting drum 10 at the second feeding speed, so as to move the cut label 8*a* away from the rest of the label ribbon 8 and, at the same time, obtain the positioning of the next skid 22 between the next two consecutive labels 8*a* of the label ribbon 8.

As soon as the next skid 22 arrives between the next two consecutive labels 8*a* of the label ribbon 8, the control means command the unreeling assembly 7 to feed the label ribbon 8 to the cutting drum 10 at the first feeding speed, so that while the cutting drum 10, continuing its rotation about its axis, brings the cut label 8*a* to the corresponding container 3 transported by the conveyor 2, the portion of the label ribbon 8 resting on the skid 22 can arrive at the applicator roller 24, so that the operating cycle of the machine can resume.

In practice it has been found that the invention fully achieves the intended aim and objects and in particular attention is drawn to the fact that, by virtue of the presence of the cavity in the blade supporting block, it is possible to considerably reduce the noise generated following the cutting of the labels via suction of the label ribbon against the blades of the cutting drum.

The invention, thus conceived, is susceptible of numerous modifications and variations, all of which are within the scope of the appended claims.

Moreover, all the details may be substituted by other, technically equivalent elements.

In practice, the materials used, as well as the contingent shapes and dimensions, may be any according to the requirements and to the state of the art.

The disclosures in Italian Patent Application No. 102021000004805 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A labeling machine comprising a conveyor of containers to be labeled along an advancement path and at least one labeling station, which is arranged along said advancement path and has an unreeling assembly for a label ribbon and a cutting drum, which is designed to receive, so that said label ribbon adheres to a lateral surface thereof, said label ribbon and which supports at least one cutting device for said label ribbon, said at least one cutting device comprising a respective suction chamber, which is open at the lateral surface of said cutting drum and accommodates internally at least one blade, said suction chamber being connectable with air suction means, in order to attract said label ribbon toward an inside of said suction chamber and against said blade and in so doing cutting said label ribbon, wherein said at least one cutting device comprises at least one respective blade supporting block which is supported by said cutting drum and supports said at least one blade, at least one portion of said blade supporting block being provided internally with at least one cavity for attenuating noise generated by cutting said label ribbon.

2. The machine according to claim 1, wherein said blade supporting block comprises a box-like body which defines said suction chamber internally, said at least one cavity being defined in at least one wall of said box-like body.

3. The machine according to claim 2, wherein said box-like body has at least two mutually opposite walls for delimiting said suction chamber, said at least one blade being interposed between said at least two walls, at least one of said two walls having said at least one cavity inside.

4. The machine according to claim 2, wherein said box-like body supports, inside said suction chamber, locking pins which pass through retention openings which are defined in said at least one blade.

5. The machine according to claim 4, wherein said locking pins are supported by at least one of said at least two mutually opposite walls.

6. The machine according to claim 1, wherein said at least one cavity is at least partially filled with a material that is different from a material with which said blade supporting block is made.

7. The machine according to claim 1, wherein vacuum is provided in said at least one cavity.

* * * * *